(12) United States Patent
Svardsjo

(10) Patent No.: US 6,424,544 B1
(45) Date of Patent: Jul. 23, 2002

(54) CONTINUOUS MODE FLYBACK CONVERTER

(75) Inventor: Claes Svardsjo, Nacka (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 33 days.

(21) Appl. No.: 09/688,171

(22) Filed: Oct. 16, 2000

Related U.S. Application Data

(63) Continuation of application No. PCT/SE99/00770, filed on May 7, 1999.

(30) Foreign Application Priority Data

May 7, 1998 (SE) ................................................ 9801595

(51) Int. Cl.[7] ............................................. H02M 3/335
(52) U.S. Cl. ................................ 363/21.12; 363/21.14; 363/127
(58) Field of Search ........................... 363/21.12, 21.14, 363/21.16, 84, 89, 125, 127

(56) References Cited

U.S. PATENT DOCUMENTS

| | | | |
|---|---|---|---|
| 4,677,536 A | | 6/1987 | Pepper |
| 4,716,514 A | * | 12/1987 | Patel ........................... 363/127 |
| 5,099,406 A | * | 3/1992 | Harada et al. ................. 363/20 |
| 5,144,547 A | | 9/1992 | Masamoto |
| 5,343,383 A | * | 8/1994 | Shinada et al. .............. 363/127 |
| 5,528,482 A | | 6/1996 | Rozman |
| 5,734,563 A | * | 3/1998 | Shinada ........................ 363/21 |
| 6,169,675 B1 | * | 1/2001 | Shimamori et al. ........... 363/70 |

* cited by examiner

Primary Examiner—Adolf Deneke Berhane
(74) Attorney, Agent, or Firm—Nixon & Vanderhye P.C.

(57) ABSTRACT

In a continuous mode flyback converter an FET transistor (110) is provided for reducing the voltage drop at the secondary side of the transformer. The use of the FET transistor makes the converter more suitable for low voltage applications since smaller power losses are imposed in the secondary side of the converter than in a conventional converter. The converter also has a DC-blocking capacitor (117) for further reducing the power losses at the secondary side.

2 Claims, 1 Drawing Sheet

CONTINUOUS MODE FLYBACK CONVERTER

This application is a continuation of PCT/SE99/00770 filed May 7, 1999.

TECHNICAL FIELD

The present invention relates to a DC—DC converter circuit, and in particular to a synchronous flyback converter circuit for operation in a continuous mode.

BACKGROUND OF THE INVENTION AND PRIOR ART

In DC—DC power supply of different kinds of electrical devices, power rectifiers are utilized in order to output a correct rectified output voltage. Typically a diode would be employed on the secondary side in order to obtain the rectified output voltage.

One way of obtaining a suitable rectifier circuit is to use flyback topology. In a flyback topology a primary side stores magnetic energy in a magnetisable core or the like during a charging interval. The energy is then fed to a secondary side during the so called flyback interval. The main advantage of a power rectifier circuit having a flyback topology compared to other rectifier circuits is its simple construction, which makes it cheap to manufacture.

Furthermore, flyback converters can be divided into two different kinds:

continuous mode flyback converters, and
discontinuous mode flyback converters.

In a continuous mode flyback converter the magnetic energy never drops to zero so that energy is continuously flowing either in or out of the core of the transformer, whereas in a discontinuous mode, intervals when energy is neither flowing in nor out of the core of the transformer occurs.

However, in a conventional flyback converter as seen in FIG. 1, which comprises, on the primary side, a primary winding 101 of a transformer 105 and a switch 103, and on the secondary side a secondary winding 107 of the transformer 105 connected to a diode 109 and an output capacitor 111 over which a load 113 can be connected, there is a problem associated with the voltage drop over the diode 109. Thus, in the case when the output voltage over the output capacitor 111 is low, e.g. less than 5 V, the voltage drop over the diode 109 becomes a significant part of the overall voltage, which makes the power converter inefficient for such low voltage applications.

Furthermore, U.S. Pat. No. 5,237,606 describes a power converter to be located in a remote terminal of a telephone system. The power converter is designed to be able to operate both in a continuous mode and in a discontinuous mode, which can occur in the specific application for which the power converter is designed. The power converter deals with the problem of a large voltage drop over the rectifying diode on the secondary side by means or using a FET transistor. However, since the aim is to provide a power converter which can operate both in a continuous mode and in a discontinuous mode, the circuit is not well suited for use in a continuous mode. This is due to the fact that in order to work properly in the discontinuous mode, control circuits are required, which besides being expensive, also galvanically interconnects the primary and secondary side of the power converter, thereby taking away the galvanic isolation between the primary and secondary side.

SUMMARY

It is an object of the present invention to overcome the problems as outlined above and to provide a continuous mode flyback converter which has a simple construction, and yet being efficient compared to the converters according to the prior art.

This object and others are obtained by the power converters as set out in the appended claims.

Thus, by replacing the diode as conventionally used as a secondary switch in the secondary side of the DC—DC converter by a FET transistor a much lower voltage drop is achieved, which thus reduces the losses on the secondary side. The FET transistor is then directly connected to an auxiliary winding arranged in series with the secondary winding of the transformer.

Furthermore, by introducing a DC-blocking capacitor in a control arrangement on the secondary side the voltage provided by the auxiliary winding can be significantly reduced, thus reducing the driving losses.

Also, if a short-circuit of the output of the converter should occur sufficient voltage will still be available for turning the secondary switch on and off.

BRIEF DESCRIPTION OF THE DRAWINGS

The present invention will now be described in more detail by way of non-limiting examples and with reference to the accompanying drawings, in which.

DESCRIPTION OF PREFERRED EMBODIMENTS

Figure 2:
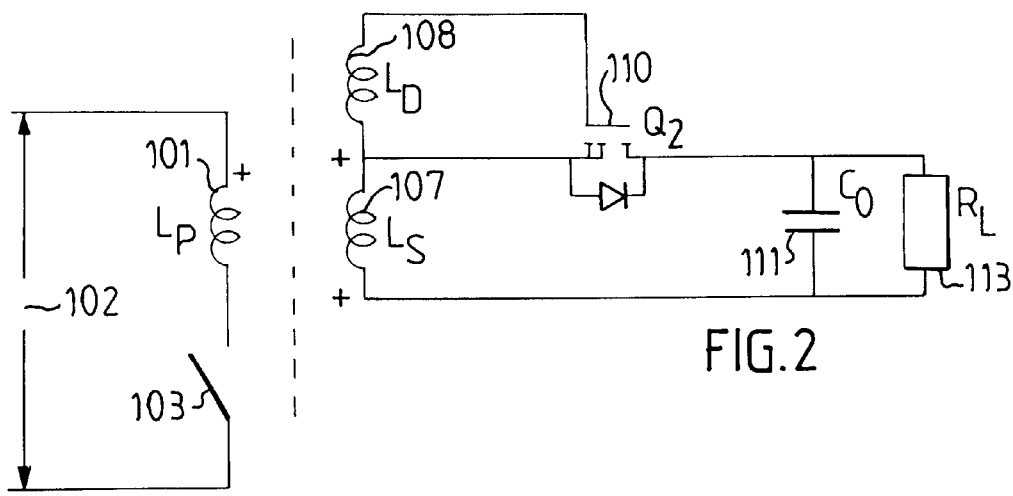
FIG. 2 is a circuit diagram of a continuous mode DC—DC converter having a FET transistor as rectifying component.

In FIG. 2 a DC—DC converter is shown. The power converter comprises on the primary side a primary wending 101 and a switch 103, the primary winding being supplied with power from a DC voltage source 102. The DC-voltage source can in turn be connected to an AC-voltage supply (not shown) via a rectifying circuit. The primary side feeds a secondary side with energy via a transformer 105. The secondary side comprises a secondary winding 107 and an auxiliary winding 108 connected in series with the secondary winding 107. A FET transistor 110 is with its source terminal connected to a point between the secondary winding 107 and the auxiliary winding 108. The gate of the transistor 110 is directly connected to the other end of the auxiliary winding 108 and the drain of the transistor 110 is connected to one end of an output capacitor 111. The other end of the output capacitor is connected to the free end of the secondary winding 107. A load 113 can then be applied over the output capacitor 111, thus connected in parallel thereto.

When the switch 103 is closed current flows through the primary winding 101, due to the voltage applied over it from the voltage source 102. The current flow through the primary winding 101 will store energy into the magnetic core of the transformer 105. When the switch 103 is turned off, the polarity across the secondary winding 107 will change and a current caused be the energy stored in the magnetic core is fed through the transistor 110 to the output terminal over the capacitor 111. This is possible thanks to the arrangement with the auxiliary winding 108, which will provide a voltage at the gate of the transistor 110 when the switch 103 is in an open state, since the auxiliary winding has the same polarisation as the secondary winding 107. Hereby a control pulse is fed to the transistor 110 so that the channel of the FET transistor will be conducting when the switch 103 is in an open state.

The advantage of such an arrangement compared to the arrangement described above in conjunction with FIG. 1, is that the voltage drop over the diode 109 is replaced by the voltage drop over the FET transistor, which typically is much smaller. I.e. instead of a voltage drop of 0.3–0.7 V, which is common for most diodes a voltage drop of less than 0.1 V can be obtained, whereby the efficiency of the DC—DC flyback converter is increased, especially when the output voltage is small, e.g. less than about 5 V. Furthermore, as is obvious, the smaller the output voltage the more important the use of a rectifying component having a low voltage drop becomes.

Figure 1:
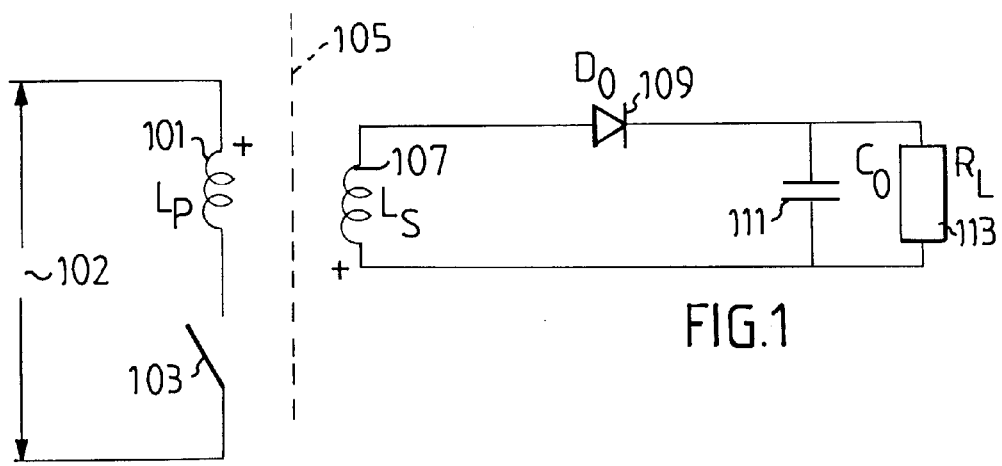
FIG. 1 is a circuit diagram of a continuous mode DC—DC converter according to the prior art.

However, by using the arrangement in FIG. 2 instead of the arrangement in FIG. 1, driving losses are introduced, since the mean value of the voltage across the auxiliary winding 108 is zero, and thus large negative amplitudes will be applied to the gate of the transistor 110 as a result of a sufficiently high gate drive voltage. Furthermore, if the output terminals of the converter is shortened, the voltage from the auxiliary winding will drop far below the gate threshold value of the transistor 110, which will cause the output current to flow via the body drain diode of the FET transistor 110, which, in turn, will significantly increase the power dissipation.

Figure 3:
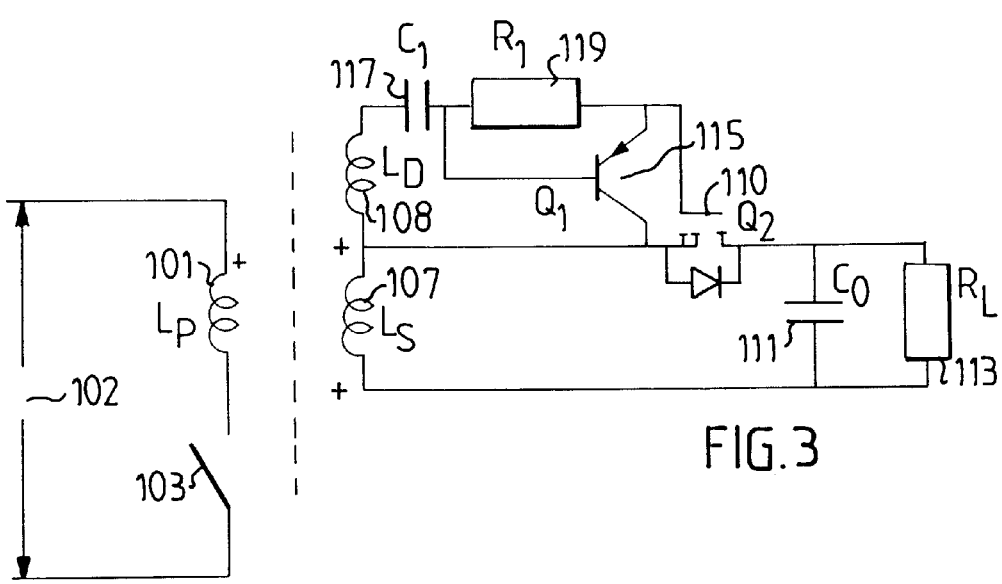
FIG. 3 is a circuit diagram of a continuous mode DC—DC converter having a FET transistor as rectifying component and having an improved drive circuitry.

This problem can however be overcome by the arrangement as shown in FIG. 3. Thus, in order to reduce driving losses, a DC-blocking capacitor 117 is inserted between the output terminal of the auxiliary winding 108 and the base of a PNP transistor 115 arranged in connection to the transistor 110. Due to the collector-base diode in the transistor 115, the gate voltage of the FET transistor 110 is prevented from going negative. The transistor 115 also provides a very quick turn off of the channel in the FET transistor 110, so that the switch loss will be reduced to a minimum.

The base of the PNP transistor 115 is through the blocking capacitor 117 connected to the free output terminal of the auxiliary winding 108, the emitter of the PNP transistor 115 is connected to the gate of the FET transistor 110 and the collector of the PNP transistor 115 is connected to the source of the FET transistor 110.

In a preferred embodiment the base and the emitter of the PNP transistor are interconnected by a resistor 119 for providing a voltage drop between the base and the emitter of the transistor 115. The resistor can be replaced by a diode or another component, which can provide the voltage drop.

Finally, as stated above, by locating the DC-blocking capacitor 117 in the drive arrangement, control pulses will be fed to the gate of the FET transistor 110 even in the event that the output terminals of the DC—DC power converter should be shortened. This is very advantageous since if no control pulses would be fed to the FET transistor 110 the output current should be forced to go through the body diode of the FET transistor 110. This would lead to high losses and possibly the FET transistor could be damaged.

The topology as described above can also be applied to other types of converters, such as Cuk and SEPIC converters.

What is claimed is:

1. A continuous mode flyback converter comprising:
    a primary and a secondary side,
    the secondary side comprising a secondary winding, the secondary side further comprising an auxiliary winding, a first terminal of the auxiliary winding being connected to the gate of a FET transistor and a second terminal of the auxiliary winding being connected to the source of the FET transistor,
    wherein the secondary side further comprises a PNP transistor, the collector of the PNP transistor being connected to the source of the FET transistor, and the base of the PNP transistor being connected to the first terminal of the auxiliary winding,
    the secondary side further including a capacitor interconnected between the first terminal of the auxiliary winding and the gate of the FET transistor, and
    wherein the FET transistor is conducting when a switch on the primary side is open, so that the converter operates in a flyback manner where energy is transferred during off or open period(s) of the switch.

2. A converter according to claim 1, characterized in that a resistor or diode is connected between the base and emitter of the PNP transistor.

* * * * *